US012658079B2

(12) United States Patent
Humpenoeder et al.

(10) Patent No.: US 12,658,079 B2
(45) Date of Patent: Jun. 16, 2026

(54) METHOD FOR PRODUCING A LIT COMPONENT FOR A VEHICLE

(71) Applicant: MERCEDES-BENZ GROUP AG, Stuttgart (DE)

(72) Inventors: Jens Humpenoeder, Ulm (DE); Peter Schmitz, Aidlingen (DE); Harald Tattko, Gaertringen (DE); Markus Klameth, Altdorf (DE); Joannis Papadopoulos, Nürtingen (DE); Bernd-Uwe Kettemann, Renningen (DE); Fritz Wazula, Calw (DE); Üsame Akkoca, Nagold (DE); Isabelle Gläsel, Ulm (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 171 days.

(21) Appl. No.: 18/578,833

(22) PCT Filed: Jun. 8, 2022

(86) PCT No.: PCT/EP2022/065533
§ 371 (c)(1),
(2) Date: Jan. 12, 2024

(87) PCT Pub. No.: WO2023/285034
PCT Pub. Date: Jan. 19, 2023

(65) Prior Publication Data
US 2024/0321149 A1 Sep. 26, 2024

(30) Foreign Application Priority Data
Jul. 13, 2021 (DE) ..................... 10 2021 003 615.8

(51) Int. Cl.
*G09F 13/06* (2006.01)
*B32B 3/08* (2006.01)
(Continued)

(52) U.S. Cl.
CPC .............. *G09F 13/06* (2013.01); *B32B 3/085* (2013.01); *B32B 3/30* (2013.01); *B32B 15/095* (2013.01);
(Continued)

(58) Field of Classification Search
CPC ........... G09F 13/06; B32B 3/085; B32B 3/30; B32B 15/095; B32B 27/40;
(Continued)

(56) References Cited

U.S. PATENT DOCUMENTS

| | | | |
|---|---|---|---|
| 10,408,391 | B2 | 9/2019 | Torvinen |
| 10,485,094 | B1 | 11/2019 | Isohätälä et al. |

(Continued)

FOREIGN PATENT DOCUMENTS

| | | |
|---|---|---|
| DE | 102020005896 A1 | 11/2020 |
| EP | 4059691 A1 | 9/2022 |

(Continued)

OTHER PUBLICATIONS

International Search Report and Written Opinion mailed Sep. 22, 2022 in related/corresponding International Application No. PCT/EP2022/065533.

(Continued)

*Primary Examiner* — Justin V Lewis
(74) *Attorney, Agent, or Firm* — PATENT PORTFOLIO BUILDERS PLLC

(57) ABSTRACT

A lit component for a vehicle has a multi-layered structure with integrated electronic components with an outer surface on the visible side. One of the layers has a metal. On the side of the layer having the metal facing away from the visible side, light-emitting diodes are arranged as part of the electronic components. The layer having the metal that faces away from the visible side is partially covered by a colored layer. The portions of the layer having the metal that are not
(Continued)

covered by the colored layer have a three-dimensional shape, in the region of which light de-coupling structures are arranged on the side of the layer having the metal which faces away from the visible side.

10 Claims, 1 Drawing Sheet

(51) Int. Cl.

| | | |
|---|---|---|
| *B32B 3/30* | (2006.01) |
| *B32B 15/095* | (2006.01) |
| *B32B 27/40* | (2006.01) |
| *B60R 13/00* | (2006.01) |

(52) U.S. Cl.
CPC .......... *B32B 27/40* (2013.01); *B32B 2255/06* (2013.01); *B32B 2307/412* (2013.01); *B32B 2457/00* (2013.01); *B32B 2551/00* (2013.01); *B32B 2605/00* (2013.01); *B60R 13/005* (2013.01)

(58) Field of Classification Search
CPC .......... B32B 2255/06; B32B 2307/412; B32B 2457/00; B32B 2551/00; B32B 2605/00; B32B 3/08; B60R 13/005; B60R 13/00

USPC ......... 40/541, 546, 550, 551, 552, 553, 556, 40/563, 573, 578, 579, 581, 582, 583
See application file for complete search history.

(56) References Cited

U.S. PATENT DOCUMENTS

| | | | |
|---|---|---|---|
| 2018/0149321 A1* | 5/2018 | Torvinen ............. H05K 1/0296 |
| 2018/0264991 A1 | 9/2018 | Ellwanger |

FOREIGN PATENT DOCUMENTS

| | | |
|---|---|---|
| JP | 2010100099 A | 5/2010 |
| JP | 2017074818 A | 4/2017 |
| JP | 2020507178 A | 3/2020 |
| WO | 2020168324 A2 | 8/2020 |
| WO | 2021099670 A1 | 5/2021 |

OTHER PUBLICATIONS

Office Action created Nov. 19, 2021 in related/corresponding DE Application No. 10 2021 003 615.8.
Office Action dated Nov. 12, 2024 in related/corresponding JP Application No. 2024500099.

\* cited by examiner

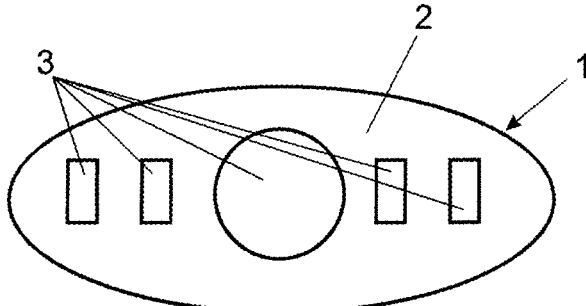
<u>Fig. 1</u>
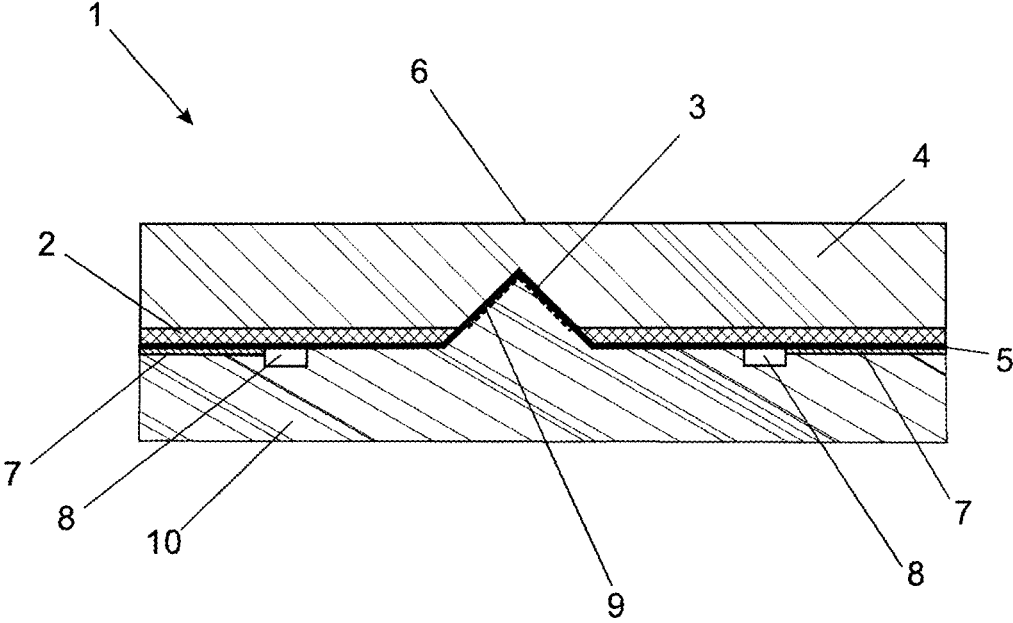
<u>Fig. 2</u>

METHOD FOR PRODUCING A LIT COMPONENT FOR A VEHICLE

BACKGROUND AND SUMMARY OF THE INVENTION

Exemplary embodiments of the invention relate to a method for producing such a illuminated component and to a vehicle having a component produced in such a way.

Illuminated components in the vehicle field, in particular in the exterior paneling of vehicles, are known from the prior art. Thus, for example, individual elements can be back-illuminated, and are completely or partially transparent in order to emit light, in particular in specific patterns. Thus, for example, illuminated brand logos or the like can be realized in the region of a vehicle radiator grille.

Such components are relatively complex in practice, because on the one hand they require the actual component having the desired optical design, and on the other hand they require a lighting unit assigned to the component. Despite the possibility of using light guides, the structure is still relatively thick from its surface serving as a visible side on one side to its surface or rear side facing this visible side on the other side. This is a significant disadvantage, in particular if it is intended to be used in the region of the exterior paneling, because due to the desired design, the installation space is exceptionally tight in many regions.

In order to alleviate this problem, a very compact structure can now be selected. From U.S. Pat. No. 10,485,094 B1, it is for example known to introduce light-emitting diodes into a two-dimensional, injection-molded structure formed of several components. This multi-layered structure of the injection-molded structure can contain different layers in different materials, including natural materials, metals, or the like. A metallic coating, for example a chromium coating of the outer surface closing the structure, and thus the front side, is also conceivable in principle according to the specified US patent.

US 2018/0149321 A1 describes a similar structure of a multi-component injection molding method, in which light-emitting diodes are also introduced. The intermediate films can contain different decorations or color. A deep drawing is used to create protrusions for the light-emitting diodes, which are then covered by a transparent covering layer from the visible side.

WO 2020/168324 A2 describes a decorative component for a vehicle with a light-emitting finish. A surface is set on a light guide, and is provided with a metallic closing layer, such that light can be emitted via individual openings.

U.S. Pat. No. 2,018,014 9321 A1 describes embodiments for light-emitting structures made of several film layers which are three-dimensional in shape and have recesses for lighting elements. Back-illuminated surfaces can then be arranged over the latter.

US 2018/0264991 A1 describes a light arrangement, which comprises two rear lights of a vehicle and an illuminated decorative strip arranged in between. The covering glass is provided with a translucent chromium film, which can be illuminated through when the light is switched on.

A method for producing a flat cladding element for a vehicle is known from DE 10 2020 005 896 A1. The element comprises a light-permeable layered body having recesses or indentations, which has been coated with transparent plastic, whereby the recesses form raised ornaments on the visible side. The structure can be illuminated with light sources.

Exemplary embodiments of the present invention are directed to an improved production method for an illuminated component, which makes it possible to easily and efficiently implement further design aspects, in particular in a space-saving component, which is suitable for the exterior planning of a vehicle.

The illuminated component to be produced for a vehicle comprises a multi-layered structure having integrated electronic components, which comprise, among other things, light-emitting diodes as part of these electronic components. One of the layers has a metal and can, for example, be a metal layer or a plastic layer provided with a metallization. The plastic layer can, for example, be metallized with the metal. The illuminated component has an outer surface on the visible side, which is also described in the following as the front side.

On the layer having the metal, the electronic components are arranged on the side facing away from this visible side. The layer having the metal is covered partially or in portions by a colored layer on its surface facing the visible side, wherein the portions of the layer having the metal that are not covered by the colored layer have a three-dimensional shaping. They are thus deformed out of the plane of the layer having the metal, for example, but not necessarily, in the direction of the visible side. The layer having the metal need not necessarily lie within a geometric plane itself, but can certainly run in a curved manner, wherein the three-dimensional shaping thus protrudes over or below the surfaces of this layer in order to achieve the desired effect.

It is further provided that in the region of these three-dimensionally formed portions of the layer having the metal, light de-coupling structures are arranged on the side or surface of the layer having the metal facing away from the visible side. the light de-coupling structures can, for example, be introduced into the layer having the metal by printing or embossing. They ensure that the light of the light-emitting diodes, which from the visible side are located behind the layer having the metal, and in particular behind the colored layer partially covering the latter on its visible side, de-couple light via the light de-coupling structures in the regions in which the colored layer is interrupted. A structure with a minimal thickness in construction transverse to the stacking direction of the individual layers can thus be obtained, which enables a very high degree of flexibility in the design, such that, for example, when the colored layer is suitably applied, individual portions remain free, which permits the layer having the metal to be seen on the one hand, and which are back-illuminated when the light-emitting diodes are switched on, on the other hand. Thus, for example, design features, writing, symbols, and the like can be very effectively depicted, which can in particular be used to depict brand logos, model designations and the like.

The method according to the invention for producing such a illuminated component provides the six basic method steps explained in the following to produce the illuminated component. In a first method step, the layer having the metal, and thus in particular the chromium film, is partially provided with the colored layer on the later visible side, which can, in particular, be implemented via printing, for example via screen printing. In a second method step, some of the electronic components are then applied on a rear side of the layer having the metal facing away from the later visible side, for example conductor paths and the like. In addition, in this method step, in the regions in which the layer having the metal is not provided with the colored layer on the opposite front side, and thus in the regions remaining free of color, the light de-coupling structures are applied. All this can take place in a known manner, in particular via screen printing or, in the case of the light de-coupling structures, also via embossing or the like.

In the next method step, electronic components that cannot be obtained via one or more printed layers are mounted. This relates in particular to light-emitting diodes, while other electronic components, such as resistors, capacitors and the like can often be produced in advance together with the conductor paths by printing on the rear side of the layer having the metal. Following this step, in a fourth method step, the regions that are not provided with the colored layer are then formed three-dimensionally by correspondingly forming the regions via deep drawing or thermoforming, for example being formed as three-dimensional structures in the direction of the later visible side beyond the colored layer. In particular, when the light de-coupling structures are embossed, unlike when the light-decoupling structures are printed, for example via a screen printing method, the light de-coupling structures can also be introduced only in this deep drawing step, in particular if the latter is implemented via suitable tools which emboss the light de-coupling structures into the layer having the metal, which can in particular be designed as a chromium film, on the side facing away from the later visible side.

In a further method step, the supporting layer is then applied to the rear side of the layer having the metal, in order thus to stabilize the previous structure on one hand, and in order to support the three-dimensionally formed regions, and simultaneously safely enclose the electronic components, on the other hand. As already described above, this step can, for example, be implemented by back injection or by applying a further film and injecting the material for the supporting layer between this film and the layer having the metal.

Finally, in a sixth method step, the visible side is then provided with a transparent plastic as a covering layer. As already mentioned above, this covering layer can preferably be flat, thus levelling the design, which has been three-dimensional on the visible side up to this point, to a smooth surface again, under which the three-dimensionality acts on the layers lying below such that although this is visible, no protrusions arise which can be haptically perceived and/or present the risk of an increased build-up of dirt.

As already mentioned, according to a very favorable development of the method according to the invention, it can be provided that the application of the transparent covering layer is produced by flooding or over-molding with a transparent plastic, in particular by flooding with polyurethane. As has also been mentioned previously, according to a very favorable development of the method according to the invention, the light de-coupling structures can be introduced into the layer having the metal in the method step 2 via a printing method, in particular a screen printing method, and/or in the method step 4 by embossing.

According to a very favorable development of the method according to the invention, it is provided that the layer having the metal is designed as a chromium film. A so-called chromium film is typically a plastic film, which is applied with a metallic appearance, for example by providing, in particular metallizing, the film by means of chromium, silver or similar materials. A film appearing to be metallic can thus be generated with a relatively small metal content, such that the film can be permeated by light in at least one direction, and in particular reflects the light in the other direction. Due to the low amount of metal, the corresponding layer can additionally be designed such that it is also largely transparent for radar radiation, such that for example corresponding radar sensors, such as are used for the environment sensors of a vehicle, can be placed behind the illuminated component without the component influencing their functionality.

According to a further, very advantageous development of the invention, it can further be provided that the colored layer is designed as an opaque colored layer. Such an opaque colored layer is not permeable for light, such that in the event of a lighting with the introduced light-emitting diodes, the light is only de-coupled in the region of the light de-coupling structures and shines through the layer having the metal, while the neighboring regions covered with the colored layer are impermeable for the light. In the preferred use of the illuminated component in the region of the exterior cladding of a vehicle, it can be provided that the colored layer is designed in the same color as the paint of the vehicle or in an appropriate color with regard to the design, for example a contrasting color.

The vehicle according to the invention comprises a component produced according to the method.

Further advantageous embodiments of the illuminated component according to the invention also result from the exemplary embodiment, which is described in more detail in the following with reference to the figures.

BRIEF DESCRIPTION OF THE DRAWING FIGURES

Here:

FIG. 1 shows a front view of a possible illuminated component in principle in a schematic depiction; and FIG. 2 shows a sectional depiction through a part of this illuminated component.

DETAILED DESCRIPTION

In the depiction of FIG. 1, an illuminated component, the entirety of which is labelled 1, can be seen, which can, for example, be introduced in the region of the exterior cladding of a vehicle. It can, for example, be the portion in the front of the vehicle, described in conventional vehicles with an internal combustion engine as a radiator grille, which, in the case of electric vehicles, can for example no longer be designed as a light-permeable grid, and can instead be designed in the form of a closed component. The component 1 itself is partially designed in the car color, and has several portions, here depicted in the form of four rectangles and a circle, labelled 3, which are not designed in the car color, and which instead appear in a metallic color, for example with a chromium appearance, when back-lighting is switched off.

As can be seen with reference to the depiction in FIG. 2, they are three-dimensional in shape, and face the observer within a transparent covering layer 4, such that, for example, the generally known appearance of chrome-plated brand logos, for example the well-known star of the applicant is created. To achieve the above, the structure is designed as is shown in the section in the depiction of FIG. 2. Particular focus lies on a simple and compact structure, which is in particular very thin in form, and yet is still in the position to achieve a three-dimensional optical effect. For this purpose, a chromium film 5 is provided as the central component as a layer having metal. The latter is provided with the colored layer 2 already mentioned on its side facing the visible side 6 depicted above in the depiction of FIG. 2, where the colored layer can in particular be a color layer in the car color. If this colored layer 2 is partially applied to the chromium film 5, the portions labelled 3 in the depiction of FIG. 1 are left free. These, as can be seen in the depiction of FIG. 2, later form a three-dimensional structure in the direction of the visible side 6, or in principle also in the opposite direction to the visible side 6.

First, the composite produced in this first method step consisting of the chromium film 5 and the colored layer 2, which has partially been applied to this chromium film 5, is still flat, however. It is then provided with electronic components, which are at least partially printed on. Purely as an example, in the depiction of FIG. 2, printed conductor paths 7 can be seen, in the region of which two light-emitting diodes 8 are then applied. In the region 3, light de-coupling structures 9 are applied, also via printing, also on the side of the chromium film 5 facing away from the visible side 6, such that the light de-coupling structures cannot be seen from the visible side 6 in the unilluminated state. This composite consisting of electronics 7, 8, chromium film 5 and colored layer 2, with the light de-coupling structures 9 applied in the corresponding portions 3, is now subjected to a deep drawing process or a thermal re-forming, in order to generate the three-dimensional design which can already be seen in FIG. 2. This three-dimensional design creates two facets within the portion 3, which can be seen from the visible side 6. After this three-dimensional forming process, the supporting layer 10 depicted in FIG. 2 is then applied, for example by back-injecting the previous structure with this supporting layer 10. The supporting layer 10 is designed as a transparent or translucent thermoplastic. The latter can in particular be back-injected behind the printed conductor paths 7, the LEDs 8 and the light de-coupling structures 9 in the region of the three-dimensionally formed regions 3.

Finally, the structure is then sealed with the covering layer 4 already mentioned, which can also be designed as a transparent thermoplastic, or in particular as a cast layer of polyurethane. The component is thus, for example, over-molded or preferably flooded with this covering layer 4, such that the layer thickness of the covering layer 4 is greater than the three-dimensional shape of the portions 3. A smooth surface is thus created on the visible side 6, under which the three-dimensional shape of the portions 3, and thus the facet structure, can be correspondingly seen, but does not protrude beyond the surface of the visible side 6.

In the unilluminated state, the structure now has the optical impression of the combination of the chromium of the chromium film 5 in the portions 3 and the car color in the colored layer 2 applied thereon. If the light-emitting diodes 8 are switched on, then the illuminated component 2 is back-illuminated, because the transparent or translucent supporting layer 10 is back illuminated. Ideally, however, the colored layer 2 is impermeable for light, such that light is emitted in the direction of the visible side 6 only in the region of the portions 3, supported or enabled by the light de-coupling structures 9. The impression thus arises of a component painted in the car color with illuminated portions 3, for example a illuminated brand logo. The light-emitting diodes 8 may be realized and controlled in any way, such that in particular different colors, changing colors or the like are also conceivable, as is flashing, regulating the light intensity, for example depending on the ambient brightness, increasing and decreasing fluctuations in the light intensities or the like.

The entire component 1 can thus be constructed exceptionally compactly transversely to the stacking direction of the individual layers, and can thus be integrated without issue into almost every existing design, and, unlike the previous structures with more complex, and correspondingly thicker lighting technology, can also be easily and efficiently installed into existing designs without having to structurally adjust the proportions and the available installation spaces.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for producing an illuminated component for a vehicle, wherein the illuminated component has a visible side and a rear side opposite the visible side, wherein the visible side of the illuminated component forms an outer surface of the illuminated component, the method comprising:

provided a multi-layered structure comprising a layer having metal and a colored layer arranged on, and covering portions of, a front side of the layer having metal, wherein the front side of the layer having metal faces the visible side of the illuminated component and the layer having metal has a rear side opposite the front side of the layer having metal; and then forming, on the rear side of the layer having metal, electronic components;

mounting further electronic components, including light-emitting diodes, on the rear side of the layer having metal;

three-dimensionally shaping, by deep drawing or thermo-forming, portions of the layer having metal not covered by the colored layer; applying a supporting layer to the rear side of the layer having metal; and providing the front side of the ene-layer having metal with a transparent plastic as a transparent covering layer.

2. The method of claim 1, wherein the transparent covering layer is applied via flooding or over-molding with a polyurethane as the transparent plastic.

3. The method of claim 1, further comprising:

applying light de-coupling structures to the layer having metal in the forming of the electronic components by printing, or in the three-dimensionally shaping the portions of the one-laver having metal not covered by the colored layer by embossing.

4. The method of claim 1, wherein the layer having metal is a chromium film.

5. The method of claim 1, wherein the colored layer is an opaque colored layer.

6. An illuminated component of a vehicle, the illuminated component comprising:

a multi-layered structure with integrated electronic components, wherein one layer of the multi-layered structure has a metal, wherein on a side facing away from a visible side of the one layer having metal, the one layer having metal includes light-emitting diodes as part of the electronic components, wherein the one layer having the metal is partially covered with a colored layer on a surface of the one layer having metal facing the visible side of the one layer, wherein portions of the one layer having the metal not covered by the colored layer have a three-dimensional shape, wherein a region of the portions of the one layer having metal not covered by the colored layer include light de-coupling structures arranged on the side of the one layer having the metal which facing away from the visible side of the one layer, and wherein the one layer having the metal is a chromium film.

7. A method for producing an illuminated component of a vehicle, the method comprising:

providing a first layer having metal as a film, wherein the first layer has a visible side facing a visible side of the illuminated component and a rear side opposite the visible side of the illuminated component;

forming a colored layer on portions of the visible side of the first layer;

mounting electronic components on the rear side of the first layer;

three-dimensionally shaping portions of the first layer not covered by the colored layer by deep drawing or thermoforming;

applying a supporting layer to the rear side of the first layer; and forming a transparent plastic covering layer on the visible side of the first layer.

8. The method of claim 7, wherein the mounting of electronic components comprises:

mounting light de-coupling structures on the rear side of the first layer; and mounting light emitting diodes on the rear side of the first layer.

9. The method of claim 8, wherein the light de-coupling structures are applied to the first layer by printing or by embossing.

10. The method of claim 8, wherein the first layer is a chromium film.

\* \* \* \* \*